H. MOCK.
STRAINER.
APPLICATION FILED JAN. 23, 1919.
1,343,679. Patented June 15, 1920.
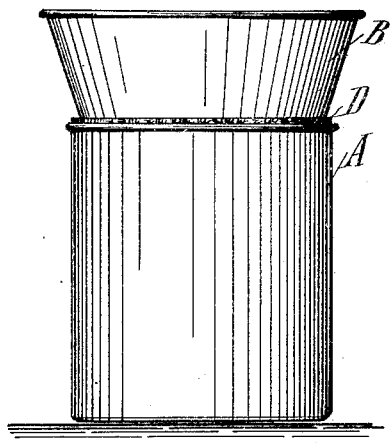
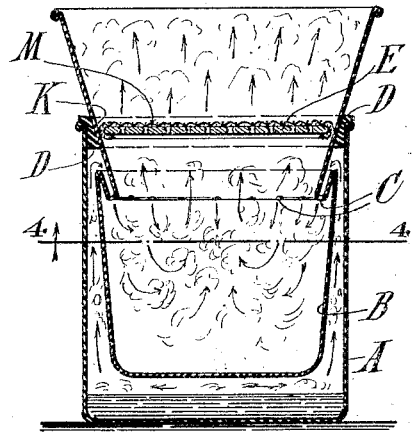
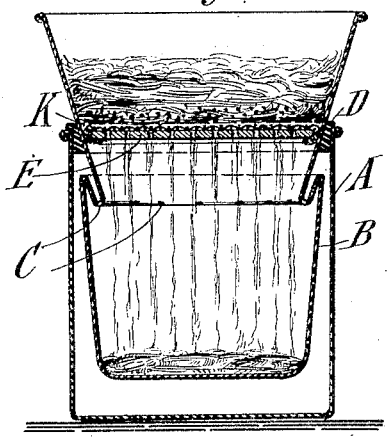
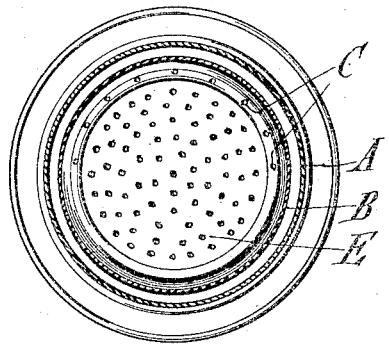
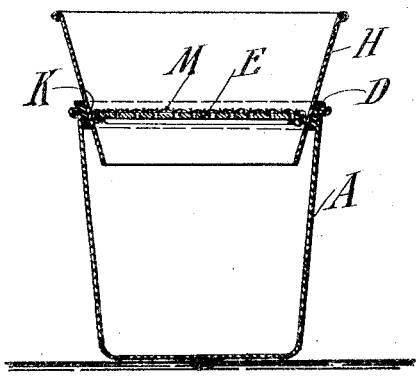
INVENTOR
Hugo Mock

UNITED STATES PATENT OFFICE.

HUGO MOCK, OF NEW YORK, N. Y.

STRAINER.

1,343,679.   Specification of Letters Patent.   Patented June 15, 1920.

Application filed January 23, 1919. Serial No. 272,653.

*To all whom it may concern:*

Be it known that I, HUGO MOCK, a citizen of the United States, residing at 930 St. Nicholas avenue, New York, in the county of New York and State of New York, have invented certain new and useful Improvements in Strainers, of which the following is a specification.

This invention relates to improvements in strainers and more particularly to that class of strainers or filters used in the household in the ordinary operations of cooking, the preparation of clear jellies and in all cases where it is desired to get a clear liquid free from suspended matters. The ordinary colloids developed in the usual process of cooking, such as oatmeal porridge, soups, sauces, etc., are difficult to strain and even where thin solutions are employed, such colloids tend to quickly clog the holes or pores of the ordinary strainer. An object of this invention is to provide a novel strainer which will quickly permit the separation of all solid particles from liquid or semi-liquid masses of any consistency and the operation of straining or filtering is accomplished by the novel apparatus and method hereinafter described.

In the drawings,

Figure 1 represents an upright perspective view of the apparatus,

Fig. 2 is a vertical sectional view of the apparatus showing same before the operation of straining or filtering has begun, Fig. 3 is another vertical sectional view showing the manner in which the material is strained or filtered in this apparatus, Fig. 4 is a horizontal sectional view on the line 4—4 of Fig. 2, and Fig. 5 shows a simpler modification of the apparatus shown in Figs. 1 to 4 inclusive.

A denotes an outer vessel preferably made of metal or agate ware. B is an inner receptacle tightly fitting into the vessel A and joined therewith by means of the rubber gasket D. C represents a series of perforations in vessel B about midway thereof at the base of the funnel-like portion of vessel B and such perforations afford the only means of communication between vessels A and B. Said holes C may be placed at equal intervals and around the entire circumference of B but are preferably put only on one side for greater convenience in pouring when the operation of straining or filtering is finished. E represents a filter which fits into the upper and funnel-like portion of the vessel B, said filter having a number of perforations as shown and having a tight fitting connection with said funnel-like portion at its edge K. The filter is preferably lined with a cloth or other fibrous material M so as to permit the separation of all particles of solid matter from the liquid.

The operation of the strainer is as follows:

A small amount of water, preferably not enough to cover the bottom of the vessel B, is put into the vessel A. The vessel B is adjusted inside the vessel A and the apparatus is set upon a stove or other heating medium. The water boils in vessel A and the steam having no other outlet, passes through the holes C into the vessel B, at first partially condensing in slight measure in vessel B until the whole apparatus is heated to the boiling point of water, after which the steam also emerges from the filter E. It will be apparent that the steam filling the interior vessel B has also carried with it the expanded air contained in the said vessel B. After the steam commences to emerge in a lively manner from the filter E, the material to be strained is poured upon the filter and the vessel A is then removed from the fire. The condensation of the steam in vessels A and B causes a partial vacuum in the interior both of vessel A and vessel B, so pressure is exerted upon the material resting upon the filter E. This pressure causes the rapid filtration of this material into the vessel B. The holes C are so positioned in vessel B that no material can be drawn into the vessel A, but falls directly into vessel B. The purpose of this is to prevent the dilution of the filtrate with the contents of the vessel A.

Where there is no objection to diluting the filtrate with the water remaining in vessel A, a simpler apparatus shown in Fig. 5 may be employed. This consists merely of the outer vessel A and of the funnel H fitting tightly into the vessel B by means of the gasket D and has fitting in there also the same form of filter as is employed in the other apparatus illustrated. The operation of this simpler form of strainer is practically the same as hereinbefore described. A small amount of water is put in the vessel A and after the steam emerges in a lively manner from the filter E, the material to be strained is put upon the filter E and the vessel A removed from the fire. By the condensation of the steam in vessel A, the material over the filter or strainer is rapidly filtered into the vessel A. By using only a small amount of water in vessel A, the filtrate need not be much diluted by the use of this simpler form of vessel.

I am aware that the use of pressure filters or strainers is old, but I believe this particular form of household strainer and the method of employing same is new.

What I claim is:—

1. In a strainer, the combination of an outer vessel, an inner vessel fitting steam tight therein, with an opening in said inner vessel below the junction of said vessels, and a tight-fitting filter within the inner vessel above said opening.

2. A strainer comprising a container, a vessel steam tight fitting into the same with a funnel-shaped portion with openings adjacent the base thereof and a filter fitted into said funnel-shaped portion and having a tight fitting connection therewith above said openings.

3. A strainer comprising a container, a vessel tightly fitting into the same with a funnel-shaped portion with perforations adjacent the base thereof and a filter fitted into said funnel-shaped portion and having a tight fitting connection therewith above said perforations, said perforations being positioned outside the path of the filtrate passing through said filter, so that the filtrate will pass by gravity to the bottom of said inner vessel and not through said perforations.

4. In a strainer, the combination of an outer vessel, a tight fitting inner vessel forming a closed chamber, a tight fitting filter in said inner vessel and steam passages connecting said inner vessel and outer vessel, said steam passages being positioned outside the path of the filtrate passing through said filter so that the filtrate would pass by gravity to the bottom of said inner vessel and not through said steam passages.

5. A process of filtering colloidal foods, which consists in placing a small quantity of water in the bottom of a container having a filtering closure at its upper portion, driving the air from said container by steam generated by the application of heat to the water, subsequently placing the food upon said filtering closure, and removing the container from the source of heat, whereby the condensation of the steam in said container will cause the filtrate to be drawn rapidly downward through the filtering closure.

In testimony whereof I hereunto affix my signature.

HUGO MOCK.